United States Patent [19]
Searfoss

[11] Patent Number: 5,887,937
[45] Date of Patent: Mar. 30, 1999

[54] PIVOT MOUNTING FOR A TRUCK BED COVER

[76] Inventor: Timothy Keith Searfoss, 1282 E. M-55, West Branch, Mich. 48661

[21] Appl. No.: 812,763

[22] Filed: Mar. 6, 1997

[51] Int. Cl.$^6$ ..................................................... B60P 7/04
[52] U.S. Cl. ............................................. 296/122; 296/98
[58] Field of Search ............................... 296/98, 100.14, 296/100.15, 107.16, 113, 122

[56] References Cited

U.S. PATENT DOCUMENTS

| | | | |
|---|---|---|---|
| 5,031,955 | 7/1991 | Searfoss | 296/98 |
| 5,076,174 | 12/1991 | Martin | 105/377.03 |
| 5,094,499 | 3/1992 | Simone, Jr. | 296/100.1 |
| 5,125,713 | 6/1992 | Willingham et al. | 296/98 |
| 5,129,698 | 7/1992 | Cohrs et al. | 296/98 |
| 5,174,625 | 12/1992 | Gothier et al. | 296/98 |
| 5,211,440 | 5/1993 | Cramaro | 296/98 |
| 5,218,743 | 6/1993 | Miller | 24/68 CD |
| 5,238,287 | 8/1993 | Haddad, Jr. | 296/98 |
| 5,240,304 | 8/1993 | Cramaro et al. | 296/100.11 |
| 5,292,169 | 3/1994 | O'Brian | 296/98 |
| 5,328,228 | 7/1994 | Klassen | 296/98 |
| 5,330,246 | 7/1994 | Bernardo | 296/98 |
| 5,524,953 | 6/1996 | Shaer | 269/100.12 |
| 5,697,663 | 12/1997 | Chenowth | 296/98 |
| 5,713,712 | 2/1998 | McIntyre | 414/328 |

OTHER PUBLICATIONS

Brochure entitled "Easy Aluminum Cover: Easy Cover Tarping System For Dump Trucks", © 1998 Aero Industries, Inc.

Distributor Price Sheet for Donovan Enterprises, Aug. 1996; pp. 1 and 11–15 dated Jan. 1993.

Brochure entitled"Pulltarps Advanced Tarping Technologies", (May 1998).

Advertisement entitled "The Best Coverage . . . Guaranteed," p. 19 from Nat'l Truck Equip. Assoc 1994 Membership Roster & Product Directory.

Brochure entitled "Easy Cover For Dump Trucks", © 1993 Aero Industries, Inc.

*Primary Examiner*—Andrew C. Pike
*Attorney, Agent, or Firm*—Brooks & Kushman P.C.

[57] ABSTRACT

An apparatus is disclosed for pivotally mounting a bow on a truck. The apparatus comprises a housing, a pivot assembly, a locator pin, and at least one spiral torsion spring. The housing is mounted to the truck generally below a bed of the truck. The pivot assembly includes a shaft and an integral bow base. The shaft is mounted in the housing, and the bow base extends from the generally perpendicular to the shaft, and is movable between a home position and a deployed position. The locator pin extends generally parallel to the shaft, and is selectively attachable to the housing at different locations relative to the shaft. The springs are disposed in the housing, and engage the locator pin and an axial groove in the shaft to bias the pivot assembly toward the home position.

36 Claims, 3 Drawing Sheets

PIVOT MOUNTING FOR A TRUCK BED COVER

TECHNICAL FIELD

This invention relates to covers for truck beds, and more particularly to an apparatus for pivotally mounting a cover over the bed of a truck.

BACKGROUND ART

Many trucks, particularly those hauling loose loads such as sand and gravel, need a truck cover to prevent the wind from blowing load particles off the load bed. Various apparatus have been devised for covering a truck load. Some such apparatus include a motor for selectively winding a flexible cover. An effective truck cover should be one which is easily operated by the truck driver so as to selectively cover and uncover the truck bed from the convenient location of the truck cab while tightly sealing both the front and rear of the truck bed to prevent wind passing under the truck cover and disturbing the truck bed contents.

My U.S. Pat. No. 5,031,955 provides a truck cover which may be conveniently motor operated from the cab of a truck while simultaneously extending the cover over the truck bed and pressing down on the front of the cover proximate a winding assembly which winds up the cover at the front of the truck bed. Similarly, U.S. Pat. No. 5,238,287 shows a front mount telescopic arm truck cover system, and U.S. Pat. No. 5,292,169 shows a truck container cover. Each of these designs and the rest of the prior art, however, is relatively complex and may require extensive welding and metal cutting.

SUMMARY OF THE INVENTION

The present invention is an apparatus for pivotally mounting a bow on a truck. The apparatus comprises a shaft rotatable with respect to the truck, a bow base, a locator pin, and at least one spring. The bow base cooperates with the shaft, and is movable between a home position and a deployed position. The spring cooperates with the shaft and with the locator pin to bias the bow base toward the home position.

Accordingly, an object of this invention is to provide an apparatus of the type described above which pivotally biases a bow base toward a home position.

Another object of this invention is to provide an apparatus of the type described above which allows a cover to selectively extend and retract over a truck load bed.

Still another object of this invention is to provide an apparatus of the type described above which does not require extensive welding or cutting of metal to mount.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
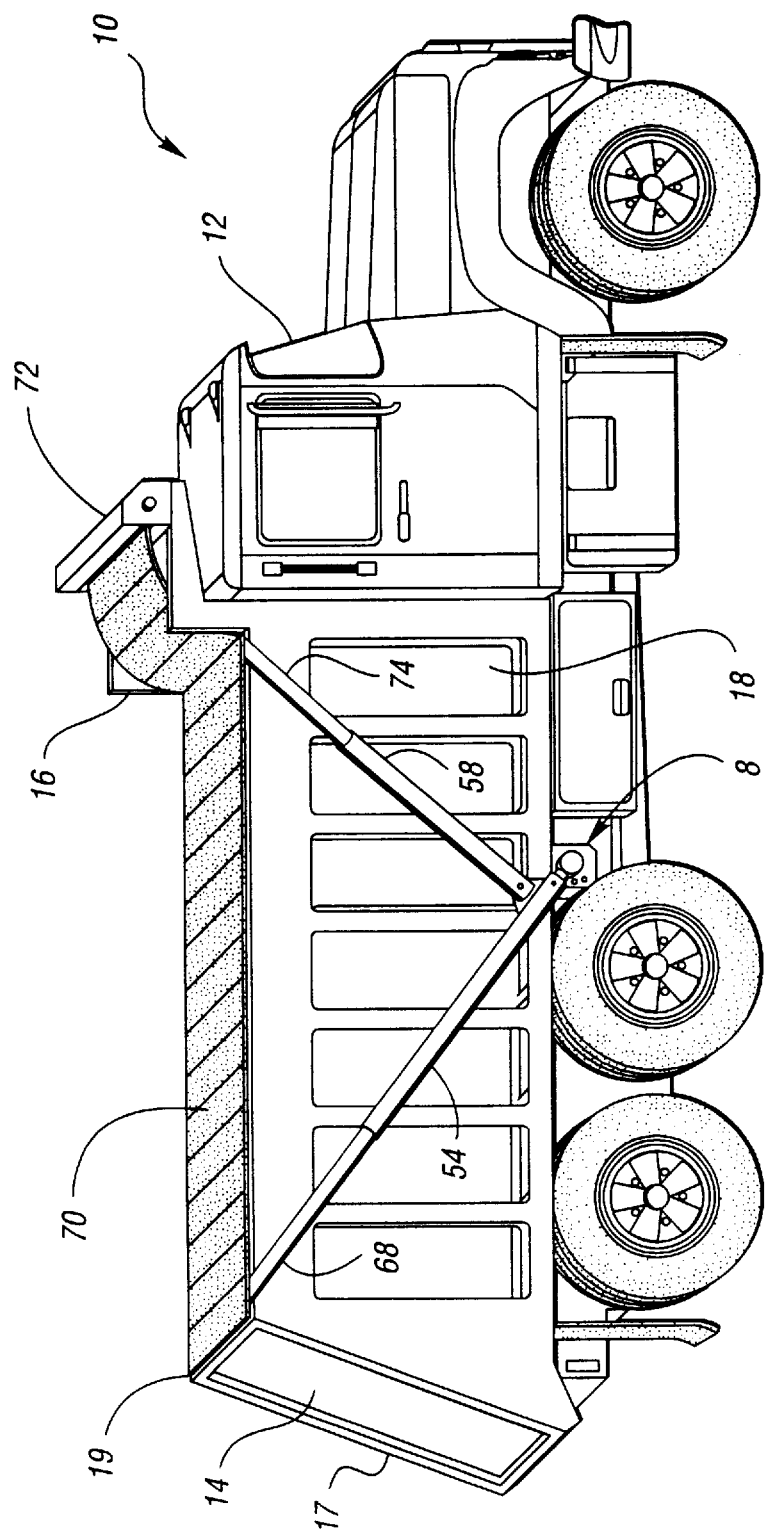
FIG. 1 is a perspective view of a truck including an apparatus according to the present invention for pivotally mounting a bow on the truck.

With reference to the drawings, the preferred embodiments of the present invention will be described. FIG. 1 shows an apparatus 8 according to the present invention for pivotally mounting a bow on a truck 10. The truck has a cab 12, and a load bed 14 including front and rear ends 16 and 17 and first and second sides 18 and 19. A pair of the apparatuses 8, with one disposed on either side of the truck, may be utilized on both flat truck beds and those having raised sides as illustrated in FIG. 1.

Figure 2:
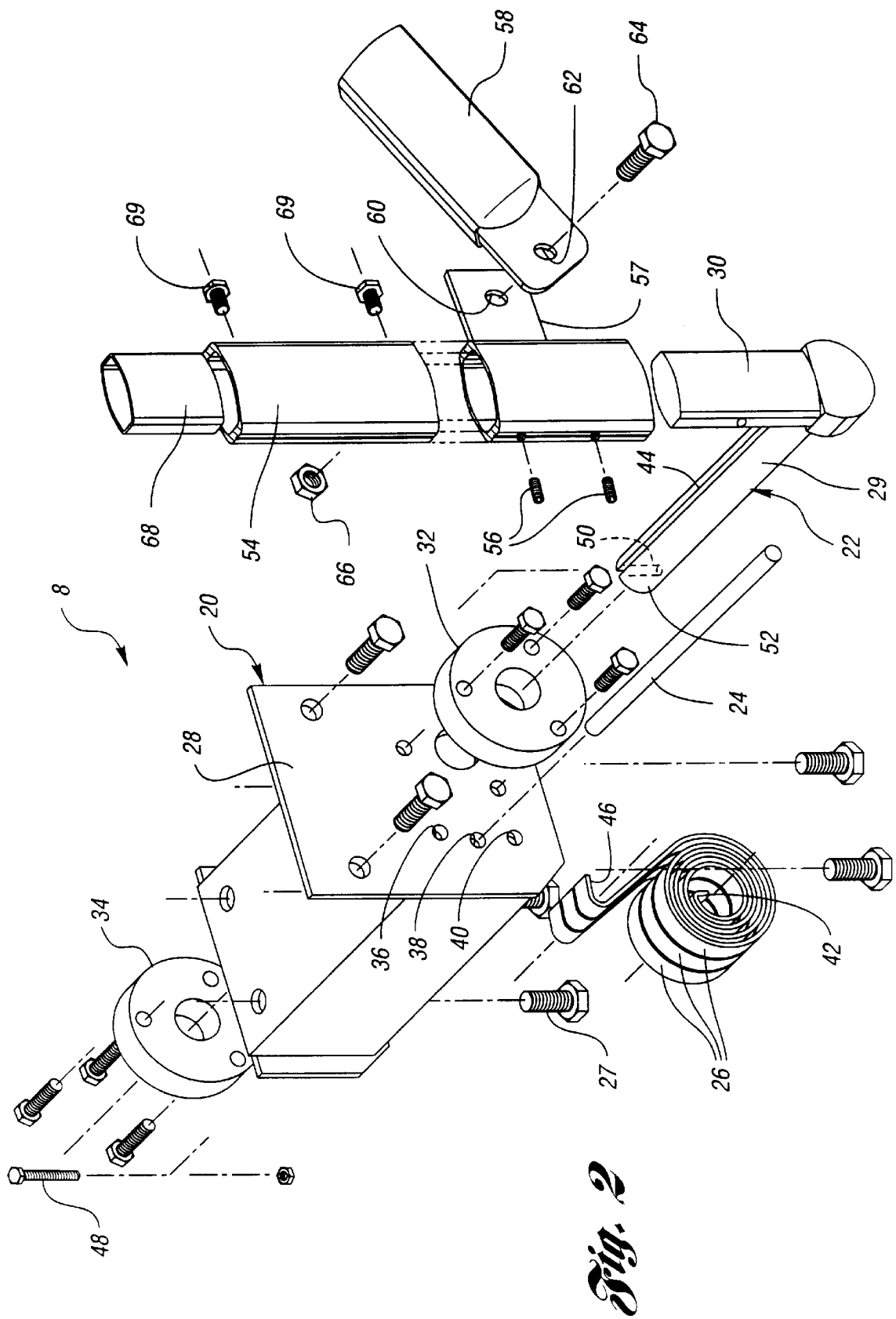
FIG. 2 is an exploded perspective view of the pivot apparatus.

FIG. 2 shows the apparatus 8 comprising a fabricated aluminum or steel housing 20, a pivot assembly 22, a locator pin 24, and a plurality of springs 26. The housing 20 is mounted by fasteners 27 to the truck generally below the load bed 14 such that a face plate 28 of the housing extends flush with or slightly beyond the side wall 18 or 19. The pivot assembly 22 includes a shaft 29 and a bow base 30 attached to the shaft. The bow base 30 is preferably integral with the shaft 29, and formed of a die cast aluminum or steel alloy. The shaft 29 extends through the housing 20, and is rotatably mounted therein by bearings 32 and 34 bolted to opposite sides of the housing.

The locator pin 24 is disposed in any of a plurality of openings 36, 38, or 40 in the housing 20, and extends generally parallel to the shaft 29. The springs 26 are preferably spiral torsion springs, and are also disposed at least partially in the housing. One end 42 of each of the springs 26 engages a groove 44 formed in the surface of and extending a substantial portion of the length of the shaft 29. The other ends 46 of the springs 26 cooperate with the locator pin 24 such that the bow base 30 is biased toward a home position as described below.

A retainer is provided for retaining the shaft 29 in the housing. In a preferred embodiment, the retainer comprises a pin 48 disposable through a hole 50 in a distal end 52 of the shaft. It should be appreciated that the distal end of the shaft may also function to retain the shaft in the housing.

The bow base 30 extends generally perpendicularly from the shaft 29 and outside of the plane of the side wall 18 or 19. An extension 54 telescopes over the bow base 30, and is secured thereto by two set screws 56 or a roll pin. The extension 54 is advantageously formed of extruded aluminum, and has a perimeter designed for strength and to diminish the front-to-back profile presented to the oncoming wind. In a preferred embodiment, the extension 54 has a non-circular, generally hexagonal perimeter. The extension 54 also has a generally hexagonal inner surface, but it should be appreciated that this inner surface may have any shape adapted to mate with the corresponding outer surface of the bow base 30.

Figure 3:
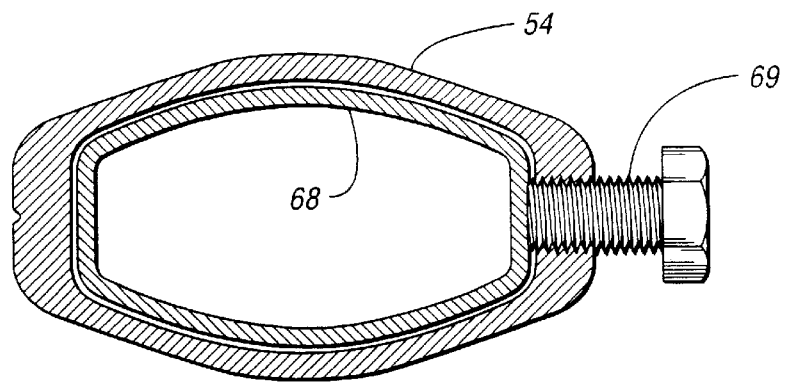
FIG. 3 is a cross-sectional view of the bow and a bow extension.

Near the base of each extension 54, a tab or flange 57 is provided for pivotally connecting the extension to a tension bow 58. To effect this arrangement, each of the tabs 56 is provided with a hole 60 that, when aligned with a corresponding hole 62 in the tension bow 58 and secured with a button head bolt 64 and a nylon-insert nut 66, allows a secure connection between the extension 54 and the tension bow. At least one supplemental extension 68 may also be provided with the pivot assembly on each side of the truck. As shown in FIG. 3, the supplemental extensions 68 preferably have a perimeter sized to telescope within the hollow extensions 54, and are secured thereto such as by tightening screws 69.

As shown in FIG. 1, the supplemental extensions 68 extend up to and engage one end of a flexible cover 70 for extending the cover over the load bed. A winding assembly 72 disposed proximate the front of the truck cooperates with the other end of the cover 70. As the extensions 54 swing toward the rear end 17 of the truck load bed 14, the cover 70 is pulled out of the winding assembly 72 and extended over the load bed. At the same time, the tension bows 58 are pulled toward the rear such that a cross member extending between the tension bows, or between supplemental tension bows 74 telescoping from the tension bows 58, rests on and applies a downward force to the cover 70 proximate the front end 16 of load bed 14 to facilitate holding the cover on the load bed. Further details of this arrangement may be found in my U.S. Pat. No. 5,031,955, the disclosure of which is hereby incorporated by reference.

Figure 4:
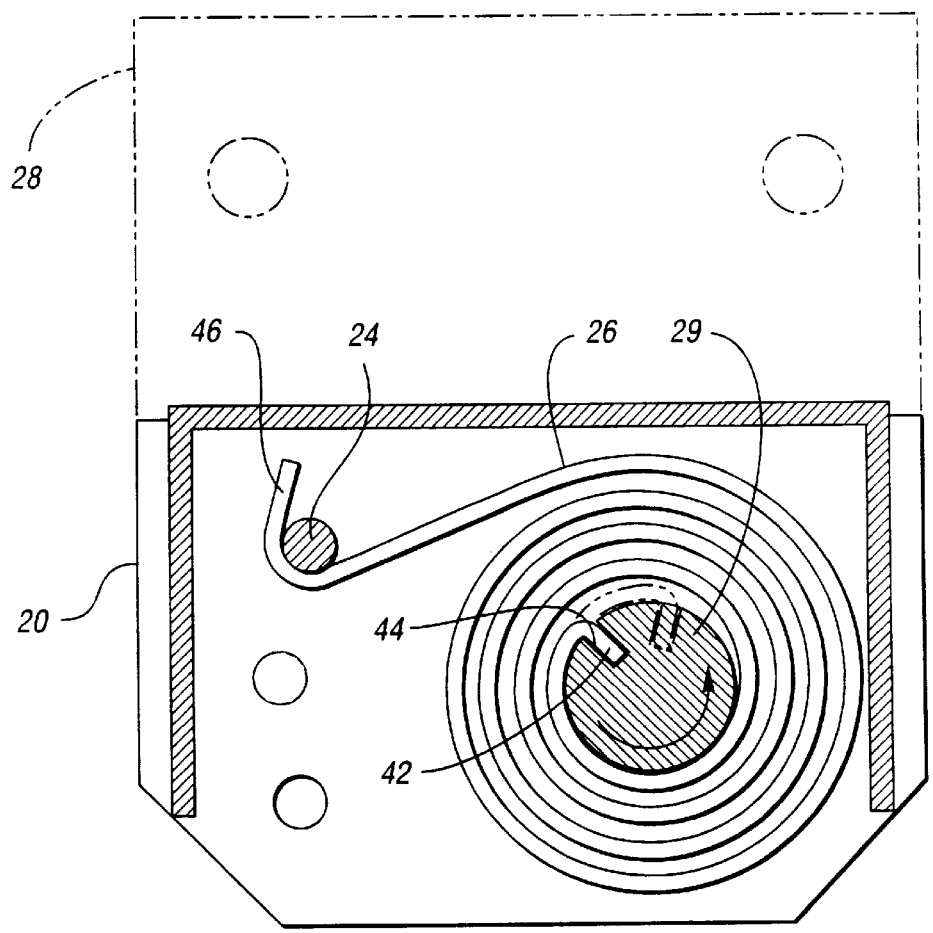
FIG. 4 is a cross-sectional view of a shaft, spring, and locator pin of the pivot apparatus.

FIG. 4 shows that the bow base 30 is movable between the home position shown in phantom and a deployed position. Springs 26 bias the shaft 29, bow base 30, and the extensions 54 and 68 toward the rear of the truck so as to hold the cover 70 in tension toward the rear of the truck. The winding assembly 72 can then be selectively energized to retract the cover and uncover the load bed 14 against the tension force of springs 26. By varying position of locator pin 24, the number of springs and/or the spring constant of the springs, the force biasing the bow base toward the deployed position is variable.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

I claim:

1. An apparatus for pivotally mounting a bow on a truck, the apparatus comprising:
    a shaft rotatable with respect to the truck;
    a bow base cooperating with the shaft and movable between a home position and a deployed position;
    a locator pin; and
    at least one spring directly engaging the shaft and cooperating with the locator pin to bias the bow base toward the deployed position.

2. The apparatus of claim 1 wherein the shaft includes a groove, and the spring engages the groove.

3. The apparatus of claim 2 wherein the groove extends in a surface of the shaft along an axis defined by the shaft.

4. The apparatus of claim 1 further comprising a housing mounted to the truck generally below a bed of the truck.

5. The apparatus of claim 4 wherein the locator pin is attachable to the housing to vary a force biasing the bow base toward the home position.

6. The apparatus of claim 4 wherein the shaft extends through the housing.

7. The apparatus of claim 4 wherein the at least one spring is disposed at least partially in the housing.

8. The apparatus of claim 4 further comprising means for retaining the shaft in the housing.

9. The apparatus of claim 4 further comprising a retainer disposed in a distal end of the shaft.

10. The apparatus of claim 4 further comprising a retainer pin disposed in a distal end of the shaft.

11. The apparatus of claim 4 further comprising a first bearing attached to the housing and cooperating with the shaft.

12. The apparatus of claim 11 wherein the first bearing is disposed outside the housing.

13. The apparatus of claim 4 further comprising a second bearing attached to the housing and cooperating with the shaft.

14. The apparatus of claim 13 wherein the second bearing is disposed outside the housing.

15. The apparatus of claim 1 wherein the locator pin defines an axis generally parallel to an axis defined by the shaft.

16. The apparatus of claim 1 wherein the at least one spring comprises a spiral torsion spring.

17. The apparatus of claim 1 further comprising a first bearing cooperating with the shaft.

18. The apparatus of claim 1 further comprising an extension cooperating with the bow base.

19. The apparatus of claim 18 wherein the extension telescopes with the bow base.

20. The apparatus of claim 18 wherein the extension has a noncircular cross section.

21. The apparatus of claim 18 wherein the extension has a generally hexagonal cross section.

22. The apparatus of claim 1 wherein the bow base has a noncircular cross section.

23. The apparatus of claim 1 wherein the bow base has a generally hexagonal cross section.

24. The apparatus of claim 1 wherein the bow base is integral with the shaft.

25. An apparatus for pivotally mounting a bow on a truck, the apparatus comprising:
    a housing;
    a pivot assembly including a shaft and an integral bow base, the shaft being mounted in the housing and rotatable about an axis, and the bow base extending from the shaft generally perpendicular to an axis defined by the shaft and being movable between a home position and a deployed position;
    a locator pin; and
    at least one spring disposed at least partially in the housing and directly engaging the shaft and cooperating with the locator pin to bias the pivot assembly toward the deployed position.

26. An apparatus for pivotally mounting a bow on a truck, the apparatus comprising:
    a housing mounted to the truck generally below a bed of the truck;
    a pivot assembly including a shaft and an integral bow base, the shaft being mounted in the housing and rotatable about an axis, and the bow base extending from the shaft generally perpendicular to an axis defined by the shaft and being movable between a home position and a deployed position;
    a locator pin extending generally parallel to the shaft axis and selectively attachable to the housing at different locations relative to the shaft; and
    at least one spiral torsion spring disposed at least partially in the housing and engaging the locator pin and an axial groove in the shaft to bias the pivot assembly toward the home position.

27. An apparatus for pivotally mounting a bow on a truck, the apparatus comprising:
    a shaft rotatable with respect to the truck;
    a bow base cooperating with the shaft and movable between a home position and a deployed position;
    a locator pin; and at least one spring cooperating with the shaft and with the locator pin to bias the bow base toward the deployed position;

the shaft including a groove, and the spring engaging the groove.

28. The apparatus of claim 27 wherein the groove extends in a surface of the shaft along an axis defined by the shaft.

29. An apparatus for pivotally mounting a bow on a truck, the apparatus comprising:

a shaft rotatable with respect to the truck;

a bow base cooperating with the shaft and movable between a home position and a deployed position;

a locator pin;

at least one spring cooperating with the shaft and with the locator pin to bias the bow base toward the deployed position; and a retainer pin disposed in a distal end of the shaft.

30. An apparatus for pivotally mounting a bow on a truck, the apparatus comprising:

a shaft rotatable with respect to the truck;

a bow base cooperating with the shaft and movable between a home position and a deployed position;

a locator pin; and at least one spring cooperating with the shaft and with the locator pin to bias the bow base toward the deployed position;

the locator pin defining an axis generally parallel to an axis defined by the shaft.

31. An apparatus for pivotally mounting a bow on a truck, the apparatus comprising:

a shaft rotatable with respect to the truck;

a bow base cooperating with the shaft and movable between a home position and a deployed position;

a locator pin; and at least one spiral torsion spring cooperating with the shaft and with the locator pin to bias the bow base toward the deployed position.

32. An apparatus for pivotally mounting a bow on a truck, the apparatus comprising:

a shaft rotatable with respect to the truck;

a bow base cooperating with the shaft and movable between a home position and a deployed position;

a locator pin;

at least one spring cooperating with the shaft and with the locator pin to bias the bow base toward the deployed position; and a first bearing cooperating with the shaft.

33. An apparatus for pivotally mounting a bow on a truck, the apparatus comprising:

a shaft rotatable with respect to the truck;

a bow base cooperating with the shaft and movable between a home position and a deployed position;

a locator pin;

at least one spring cooperating with the shaft and with the locator pin to bias the bow base toward the deployed position;

a housing mounted to the truck generally below a bed of the truck; and a first bearing attached to the housing and cooperating with the shaft.

34. The apparatus of claim 33 wherein the first bearing is disposed outside the housing.

35. The apparatus of claim 33 further comprising a second bearing attached to the housing and cooperating with the shaft.

36. The apparatus of claim 35 wherein the second bearing is disposed outside the housing.

* * * * *